ated October 8, 1878; application filed
UNITED STATES PATENT OFFICE.

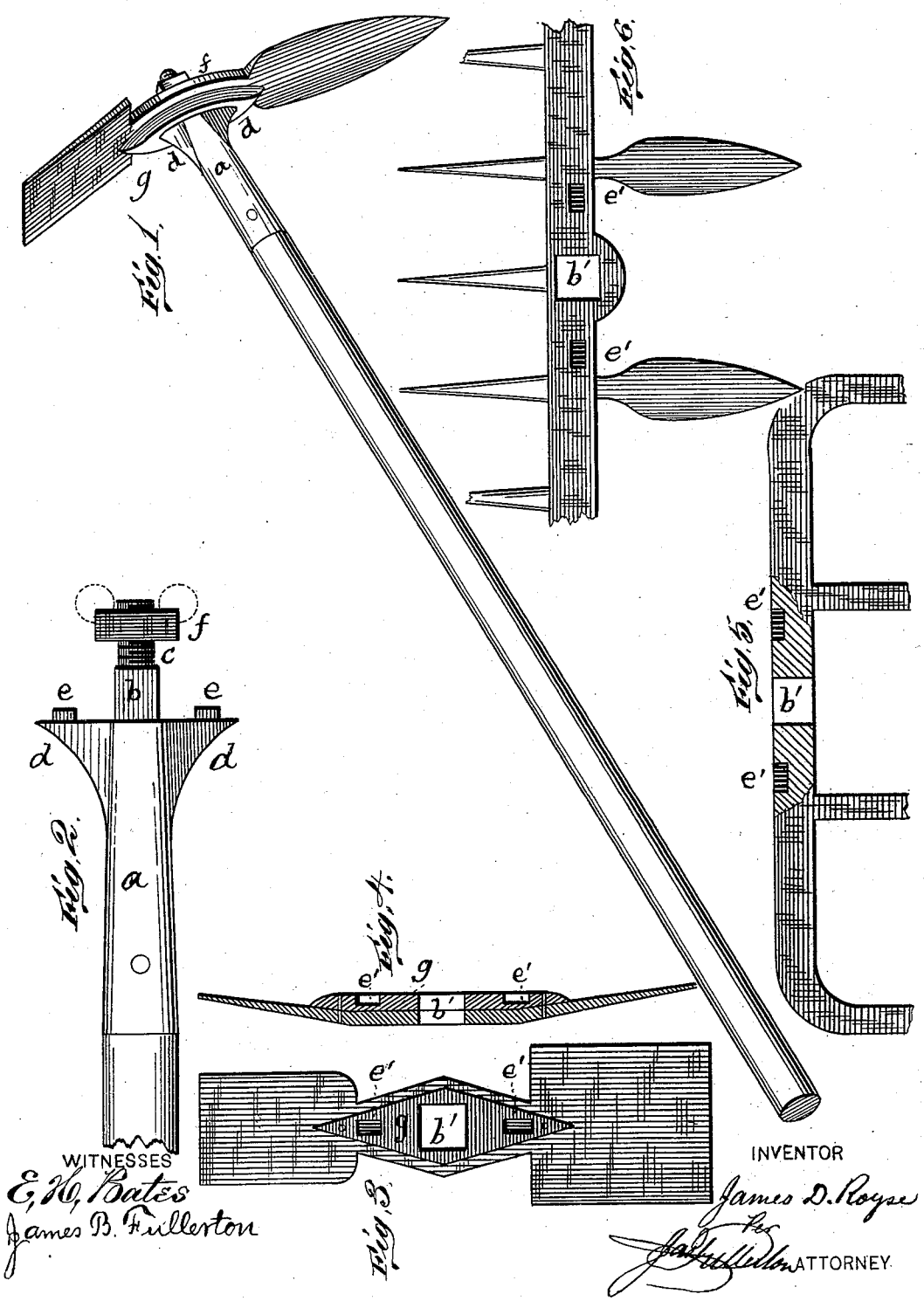

JAMES D. ROYSE, OF CANE VALLEY, KENTUCKY.

IMPROVEMENT IN COMBINATION GARDEN-TOOLS.

Specification forming part of Letters Patent No. 208,854, dated October 8, 1878; application filed August 5, 1878.

*To all whom it may concern:*

Be it known that I, JAMES D. ROYSE, of Cane Valley, in the county of Adair and State of Kentucky, have invented certain new and useful Improvements in Combination Garden-Tools; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 is a perspective view of the handle of my garden implement with a hoe and plow attached. Fig. 2 is a view of the handle, showing the tenons and nut. Fig. 3 shows the double hoe detached. Fig. 4 is a sectional view of the same. Fig. 5 shows the adjustable fork. Fig. 6 is part of the rake and cultivator.

My invention is an improvement in hand garden implements, by means of which a number of different tools may be readily and securely attached to a single handle, making a convenient combination for gardeners' uses.

I construct my implement as follows: The metallic thimble or socket $a$ is fitted in the usual manner to a handle of suitable size. This socket terminates in a square tenon, $b$, and screw $c$, and is provided with shoulders $d$ bearing the projections $e\ e$. The various tools to be attached to this handle are constructed with mortises $b'$, which fit over the tenon $b$, and are provided with recesses $e'\ e'$, corresponding to the projections on the shoulders of the socket. These projections and corresponding recesses prevent the tool from turning upon the handle.

The tool is secured firmly in its position upon the square tenon by means of the nut or thumb-screw $f$. By this arrangement a single handle may serve for any number of tools desired, as they can be attached or detached in a moment, and without trouble.

I have shown in the drawings a double hoe with broad and narrow blades, a rake and cultivator, a hoe and plow, and a digging or manure fork; but the handle may be also applied to a spade, a shovel, and many other tools used in the garden. It is only necessary that they shall be provided with the square mortises and recesses to fit the tenon and projections on the socket of the handle.

In making the double hoe and hoe and plow, I strengthen the shank by the bracing-piece $g$, which may be riveted on. The blades will be thus held at the proper angle for the effective use of the implement.

Instead of the socket a tongue constructed with the tenon and screw and shoulders and projections may be driven into the end of the handle and secured by a ring or ferrule.

Having thus described my invention, I claim as new and desire to secure by Letters Patent—

The combination of the tang or socket $a$, having the tenon $b$ and screw $c$, constructed with shoulders $d$, provided with the projections $e\ e$, with the adjustable tools having bracing-piece $g$ and mortises and recesses corresponding to the tenon and projections upon the tang or socket, substantially as described, and for the purposes set forth.

In testimony that I claim the foregoing as my own I affix my signature in presence of two witnesses.

JAMES D. ROYSE.

Witnesses:
 J. R. SAMPSON,
 THOS. CRAVENS.